United States Patent Office 3,051,275
Patented Aug. 28, 1962

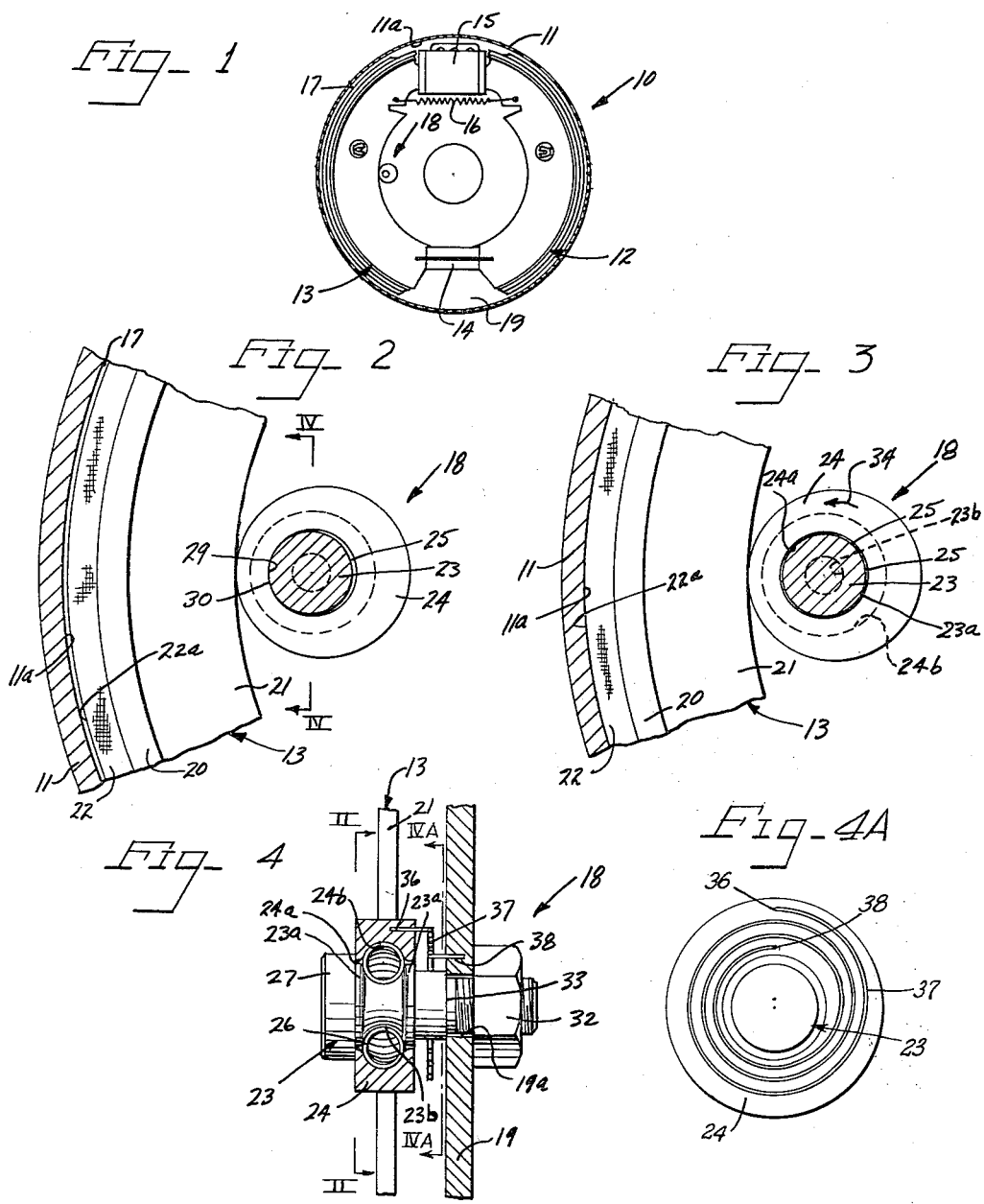

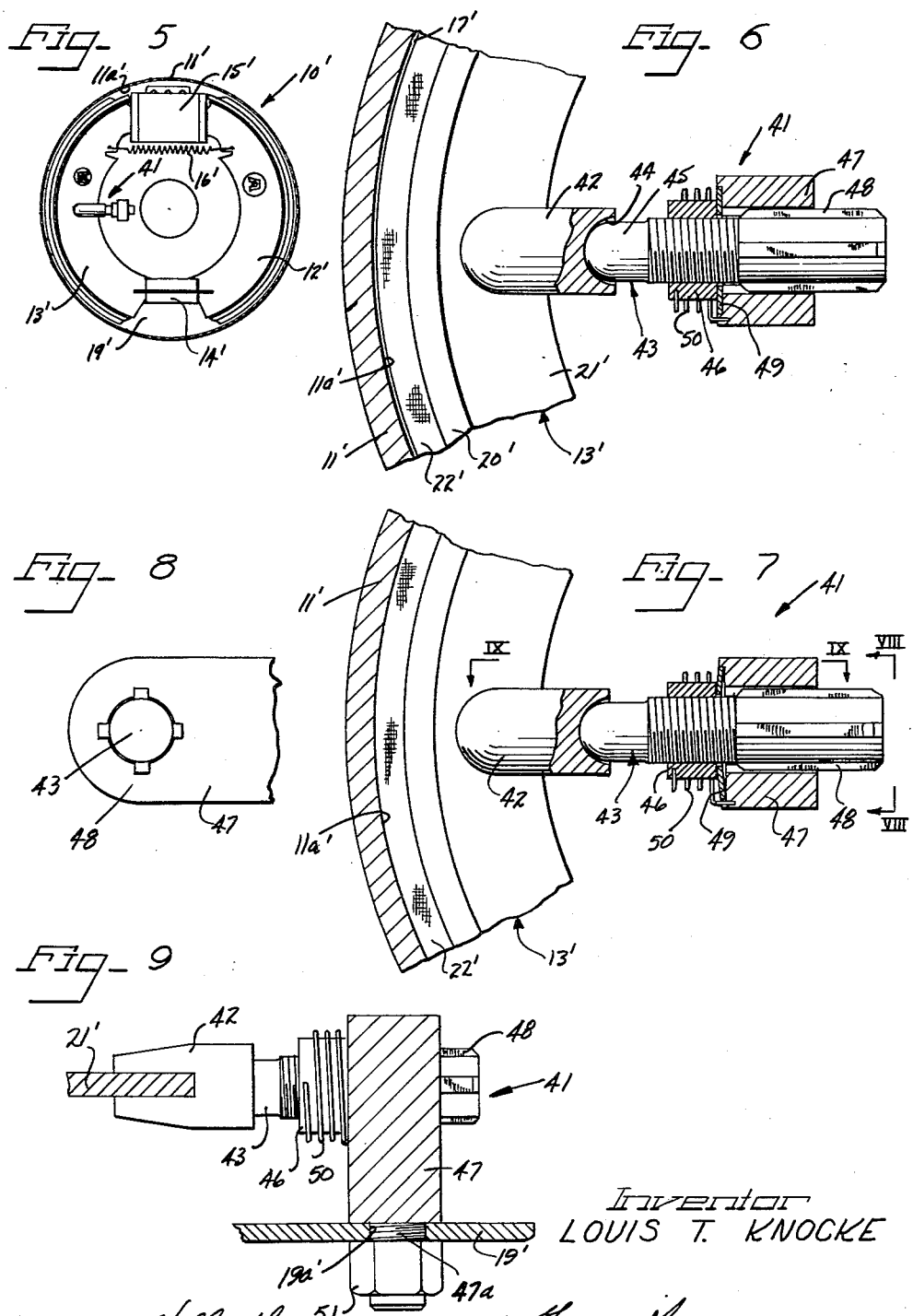

3,051,275
AUTOMATIC BRAKE ADJUSTER
Louis T. Knocke, Birmingham, Mich., assignor to Thompson Ramo Wooldridge Inc., Cleveland, Ohio, a corporation of Ohio
Filed Sept. 23, 1959, Ser. No. 841,816
4 Claims. (Cl. 188—196)

The present invention relates to improvements in vehicle brake construction and particularly to an improved brake adjusting mechanism for automatically positioning a brake shoe to compensate for brake lining wear.

In vehicle brakes such as those utilized for automotive vehicles, the brake shoe carries a lining which is frictionally applied to a braking surface. The clearance between the lining and surface when the brake is released is preferably maintained constant and with wear of the lining adjustment must be made to move the shoe and lining closer to the surface in order to reduce the gap for improved brake application and operation. A feature of the invention is the provision of an automatic wear compensating or adjusting mechanism which gradually and uniformly compensates for brake lining wear maintaining an optimum gap between the brake lining and braking surface utilizing a mechanism that is reliable and effective in operation.

Accordingly, one of the objects of the invention is to provide an improved brake lining wear compensating mechanism which automatically controls the position of a brake shoe to maintain an optimum gap and compensate for brake lining wear.

Another object of the invention is to provide an improved brake shoe positioning mechanism which automatically responds to even the slightest wear of the lining to maintain the brake shoe gap accurately constant.

Another object of the invention is to provide a self-adjusting brake mechanism having a minimum number of parts for reliability and inexpensive construction.

Other objects and advantages will become more apparent with the teaching of the principles of the invention in connection with the disclosure of the preferred embodiments thereof in the specification, claims and drawings, in which:

FIGURE 1 is a vertical sectional view taken through a brake drum and illustrating a braking assembly of the type embodying the principles of the present invention;

FIGURE 2 is a fragmentary sectional view taken substantially along line II—II of FIGURE 4, showing the position of the parts before application of the brake;

FIGURE 3 is a fragmentary sectional view similar to FIGURE 2, showing the position of the parts when the brake is applied;

FIGURE 4 is a vertical fragmentary sectional view taken substantially along line IV—IV of FIGURE 2;

FIGURE 4A is a vertical sectional view taken substantially along line IVA—IVA of FIGURE 4;

FIGURE 5 is a vertical sectional view, similar to FIGURE 1, and illustrating another form of the invention;

FIGURE 6 is an enlarged fragmentary elevational view of the brake adjusting mechanism of FIGURES 5 through 9, illustrating parts broken away for purposes of clarity and showing the position of the parts when the brake is not applied;

FIGURE 7 is a fragmentary view similar to FIGURE 6 showing the position of the parts when the brake is applied;

FIGURE 8 is a detailed elevational view taken substantially along line VIII—VIII of FIGURE 7; and FIGURE 9 is a sectional view taken substantially along line IX—IX of FIGURE 7.

As shown on the drawings:
FIGURE 1 illustrates a brake assembly 10 with a rotating brake drum 11 attached to a vehicle wheel, not shown. The brake assembly includes brake shoes 12 and 13 which are connected for expanding radially outwardly against an inner brake surface 11a of the brake drum. The shoes are connected to each other at 14 at their lower ends and are expanded outwardly at their upper ends by suitable operating mechanisms such as a hydraulic cylinder 15. Delivery of hydraulic fluid to the cylinder 15 will expand the shoes radially outwardly and release of the fluid will permit a tension spring 16, connected between the shoes, to draw them back together. The operating cylinder 15 and the mechanism for mounting the shoes for radial expansion are suitably supported on a surface 19 mounted on the vehicle in a non-rotatable fashion so as to be able to apply a stopping torque to the brake drum 11 when the shoes are expanded.

When the hydraulic operating fluid is released from the cylinder 15, the spring 16 draws the brake shoes together to determine the clearance or gap 17 between the shoes and the inner surface 11a of the brake drum. This clearance is determined by an automatic adjusting device 18, which will be described in detail in FIGURES 2, 3 and 4. Duplicate brake adjusting mechanisms are usually used and required, one for each shoe, and the desired minimum clearance of each shoe lining with the drum is obtained on a specific take-up action dependent on its rate of wear; the adjusting mechanism 18 is shown as being applied to only the one shoe 13, for simplicity of illustration and description.

As illustrated primarily in FIGURES 2, 3 and 4, the brake shoe 13 includes an outer arcuate plate member 20 with a radially inwardly extending flange or web member 21 integral with the plate member 20. The brake lining 22 of suitable fabricated brake material is attached to the plate member 20 and has an outer surface 22a which frictionally engages the surface 11a of the drum to apply stopping torque to the vehicle. Engaging the inner edge of the flange 21 is a follow-up member 24 in the form of an eccentric cam ring 24. The cam ring is mounted for relative rotation on a stationary support pin 23. The support pin has a shank portion 23a which is smaller in diameter than the opening 24a through the cam ring so that the ring has a limited lateral freedom of motion. The difference in diameter in the shank 23a and the opening 24a of the ring provides a gap 25. The difference in the diameter of the opening 24a and the shank 23a is substantially equal to twice the clearance gap 17 desired. The ring gap 25 permits the follow-up cam ring 24 to follow the shoe 13 between a first position, shown in FIGURE 2 and a second position, shown in FIGURE 3. The first position corresponds to the brake release position and the second position corresponds to the brake applying position.

The follow-up cam ring 24 is urged from the first position of FIGURE 2 to the second position of FIGURE 3 to follow the brake by a biasing means shown in the form of a compressible centralizing bracelet spring or spring ring 26. The spring ring is illustrated as being formed of a continuous annular coiled spring. The coil spring seats in a groove 23b in the shank 23a of the supporting pin 23 and is located in a groove 24b in the inner surface 24a of the follow up cam ring. The spring ring 26 thus resiliently collapses when the brake is released and the brake spring 16 pulls the brake shoe to the position of FIGURE 2. The centralizing spring may have different forms such as a circular band spring of arc-shaped cross section, or a band spring with a series of fingers or cantilever arms, integral, to give the desired centralizing action in respect to the cam and pin. The cam ring 24 is continually urged to second position, that is, centered on the pin 23, and when the brake is applied the cam ring follows the brake shoe to the position of FIGURE 3.

As will be appreciated by those skilled in the art the spring, cam, and pin may be constructed in various ways for ease of assembly. The construction must provide sufficient deformability in the annular spring ring, together with the necessary groove depth in cam and pin to make assembly possible. One arrangement would include the provision of a separate sleeve forming half of this annular spring groove in the pin and a shoulder to limit the side movement of the cam, said sleeve being assembled onto the pin after the cam, spring and pin are assembled, and said sleeve also providing a shoulder to bear against plate 19.

The support pin 23 for the cam ring is mounted in a hole 19a in the stationary plate 19. The pin has a head 27 which helps hold the cam ring 24 in place and has a reduced threaded portion at the other end providing a shoulder 33 which seats against the plate 19 and permits tightening a nut 32 over the threaded end of the pin to secure it in place.

The rigid pin provides a first stop for limiting the lateral movement of the cam ring 24 in its first position. As illustrated in FIGURE 2, the inner surface of the cam ring at 29 engages the outer surface of the shank of the pin at 30. Since the shoe bears against the cam ring, this of course limits the movement of the brake shoe 13 so that its spring 16 can draw it no further inwardly and establishes its release position and therefore the size of the clearance gap 17.

In the movement of the cam ring to its second position, as illustrated in FIGURE 3, the lateral movement will stop when the ring becomes centered on the pin and the spring ring 26 and the grooves 23b and 24b in effect act as a second stop to position the cam ring. Any further movement of the brake shoe, such as occurs with wear of the brake lining 22 will tend to cause a clearance between the outer surface of the cam ring 24 and the edge of the flange 21 of the brake shoe. No clearance occurs, however, however, since the cam ring is continually urged rotationally in the direction shown by the arrow 34 by a torsion spring 37, FIGURES 4 and 4A, having an end 36 anchored in the cam ring and an end 38 anchored on the plate 19. Because the cam ring is eccentric it will continually tend to close any space which occurs between the follow up cam ring and the brake shoe when the brake shoe is moved beyond the second position, and thus the mechanism will detect any tendency of the brake shoe to move away from the follow up member and will automatically shift the position at which the brake shoe is stopped (when it is released) to maintain a constant clearance gap 17.

With wear of the brake lining 22, its brake application position shifts to the left, as shown in FIGURES 2 and 3, and the braket release position (the position where it is stopped by the cam ring) is automatically also shifted to the left. Thus the release position and the contact point between the shoe and cam shift to the left.

In the arrangement illustrating another form of the invention, in FIGURE 5, a braking assembly 10′ includes a brake drum 11′ having an inner brake surface 11a′ with shoes 12′ and 13′ connected at 14′ at their lower ends and expanded by a hydraulic cylinder 15′. The shoes are drawn together by a tension spring 16′. As illustrated in FIGURE 6, the shoe 13′ has an arcuate outer plate 20′ with an inner radially extending flange 21′ and a lining 22′ attached to the outer surface of the plate 20′ with a gap 17′ between the lining and the brake surface 11a′ when the brake is released.

The brake adjusting mechanism 41 is illustrated as operating on the shoe 13′ and the position of this mechanism may be changed and individual mechanism may be provided for each brake shoe. The shoes in the brake adjusting mechanism are supported on a stationary plate 19′ on the vehicle.

As illustrated in FIGURES 6 through 9, a connector 42 is secured to the flange 21′ of the brake shoe for engagement by a follow up threaded bolt member. The follow-up bolt member has a rounded end 45 and is received by a concave socket 44 in the connector 42. The rounded end and socket provide a universal joint action. Threaded on the bolt is a driving member in the form of a driving nut 46 which is rotated in response to wear of the brake lining 22′ for movement of the brake shoe beyond the brake applied position, to maintain contact between end 45 and concave socket 44 (FIG. 7). The minimum desired gap 17 is maintained by compressing spring washer 49 from its fully expanded position (FIG. 7) to its flat position (FIG. 6). The follow up bolt 43 is non-rotatably mounted in a support or mount 47 having a threaded end 47a extending through a hole 19a′ in the plate 19′ and receiving a nut 51 to hold it on the plate 19′. The mount 47 is internally splined to receive splines 48 of the follow-up bolt 43.

The drive nut 46 is continually urged from a first position, as shown in FIGURE 6, to a second position, as shown in FIGURE 7 by a conical spring washer 49 which seats in a recess in the mount 47. The first position of FIGURE 6 corresponds with the brake release position, and the second position of FIGURE 7 corresponds to the brake applied position. The recess in the mount 47 acts as a first stop to determine the first position and the limit of expansion of the washer acting against the recess of the mount 47 provides in effect a second stop.

The drive nut 46 is torsionally urged by a coil torsion spring 50 to drive the nut in a direction to move the follow up bolt 43 toward second position. The spring washer 49 is shown fully expanded in FIGURE 7, and if due to wear of the brake lining 22; the shoe 13′ moves beyond the second position, as limited by the fully expanded position of the spring washer 49, a space will tend to be created between the head 45 of follow-up bolt and the socket 44 to release the pressure between the nut 46 and the bolt thus permitting the nut to rotate and drive the bolt forwardly. This changes the location of the position where the brake shoe is stopped when it is released. In other words the release position of the brake shoe has shifted further to the left of the first position of the follow-up bolt and drive nut.

In operation, with reference to FIGURES 1 through 4, the clearance gap 17 is originally established by the position of the pin 23 and the difference in diameters between the shank 23a of the pin and the opening 24a of the follow-up cam ring 24. As the operator applies the brake, the brake shoe moves from the release position of FIGURE 2 to the applied position of FIGURE 3, and the cam ring 24 follows the shoe as the compressible spring ring expands to its normal position. As the brake shoe lining 22 wears it will move beyond the normal applied position beyond the second position of the cam ring as established by the fully expanded compressible spring 26, and the torsion spring 37 will rotate the cam ring to immediately prevent formation of a gap between the ring and the flange 21. Similarly, in the arrangement of FIGURES 5 and 7, the brake shoe 13′ moves beyond its normal applied position or beyond the second position of the follow-up bolt 43, as established by the fully expanded position of the washer 49, and the drive nut will automatically rotate to move the follow-up bolt 43 forwardly. The follow-up movements of the cam ring 23 and of the follow-up bolt 43 establish a release position for the brake maintaining a constant gap between the brake lining and brake shoe.

Thus it will be seen that I have provided an improved automatic brake adjusting mechanism which meets the objectives and advantages hereinbefore set forth. The mechanism is reliable in operation, requires a minimum number of parts and is well adapted for continuous operation without servicing for the full life of the brake lining.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An automatic brake adjusting mechanism for positioning a brake shoe comprising an element adapted to be a rigid part of a brake shoe, a follow up cam member for engaging said element, a support for said cam member supporting said cam member for movement between a first position and a second position and limiting movement of said cam member away from the brake surface and establishing a brake release position, means biasing the cam member to a second position to move with said element as the shoe moves against the brake surface, means limiting movement of the cam member at said second position, and biasing means urging the cam member in a direction to prevent a space from forming between the cam member and the element when the element tends to move beyond said second position of the follow up member so that wear in the brake shoe will be automatically compensated.

2. An automatic brake adjusting mechanism for positioning a brake shoe comprising an element adapted to be a rigid part of a brake shoe, a rotatable eccentric follow up cam member for engaging said element, a support for said cam member supporting said cam member for rotational movement between a first position and a second position and limiting movement of the cam member in said first position and thereby limiting movement of the element and brake shoe away from a brake surface, said support also limiting movement of the cam member in said second position, means biasing the cam member laterally only to a second position to move with the element as the brake shoe moves into engagement with the brake surface, and torsional spring means urging the cam member in rotation to prevent a space from forming between the cam member and the element when the element moves beyond said second position of the follow up cam member and the biasing means is no longer effective beyond said second position to automatically compensate for wear of the brake shoe.

3. An automatic brake adjusting mechanism for positioning a brake shoe comprising an element adapted for rigid attachment to a brake shoe, an annular rotatable eccentric follow up cam member for engaging said element, a fixed support member loosely and pivotally supporting said rotatable cam member thereon and limiting movement of the cam member laterally between a first position wherein the cam member stops movement of the element to stop movement of the brake shoe away from a brake surface and a second position to which the cam member moves in following the element, an annular compressible spring ring positioned between the cam member and said support member for urging the cam member from first to second position, and a torsional spring means urging the cam member in rotation in a direction to prevent any space appearing between said element and cam member when the element moves beyond said second position and said spring ring urges the cam member to second position only.

4. An automatic brake adjusting mechanism for positioning a brake shoe comprising an element adapted for rigid attachment to a brake shoe, an annular rotatable eccentric follow up cam member for engaging said element, a fixed pivotal support member loosely supporting said rotatable cam member thereon and limiting movement of the cam member laterally at a first position wherein the cam member stops movement of the element and brake shoe away from a brake surface, an inner groove in said cam member, a mating outer groove in said pivotal support member, a coiled spring formed into a continuous annular ring and positioned in said groove for urging the cam member from said first to a second position with movement of said element from said first to second positions, and a torsional spring means urging the cam member in rotation in a direction to prevent any space appearing between the element and cam member when the element moves beyond said second position.

References Cited in the file of this patent

UNITED STATES PATENTS

| | | |
|---|---|---|
| 2,196,799 | Keplinger | Apr. 9, 1940 |
| 2,205,889 | Mabrito | June 25, 1940 |
| 2,216,861 | Swift | Oct. 8, 1940 |
| 2,222,858 | Ryan | Nov. 26, 1940 |
| 2,236,776 | Ludwig | Apr. 1, 1941 |
| 2,421,802 | Mould | June 10, 1947 |
| 2,870,877 | Voigt | Jan. 27, 1959 |
| 2,902,120 | Nahodil | Sept. 1, 1959 |

FOREIGN PATENTS

| | | |
|---|---|---|
| 1,123,781 | France | June 18, 1956 |